Nov. 16, 1937.　　　J. R. SPELLACY　　　2,099,379
METHOD OF MANUFACTURING CASEIN
Filed Sept. 19, 1934
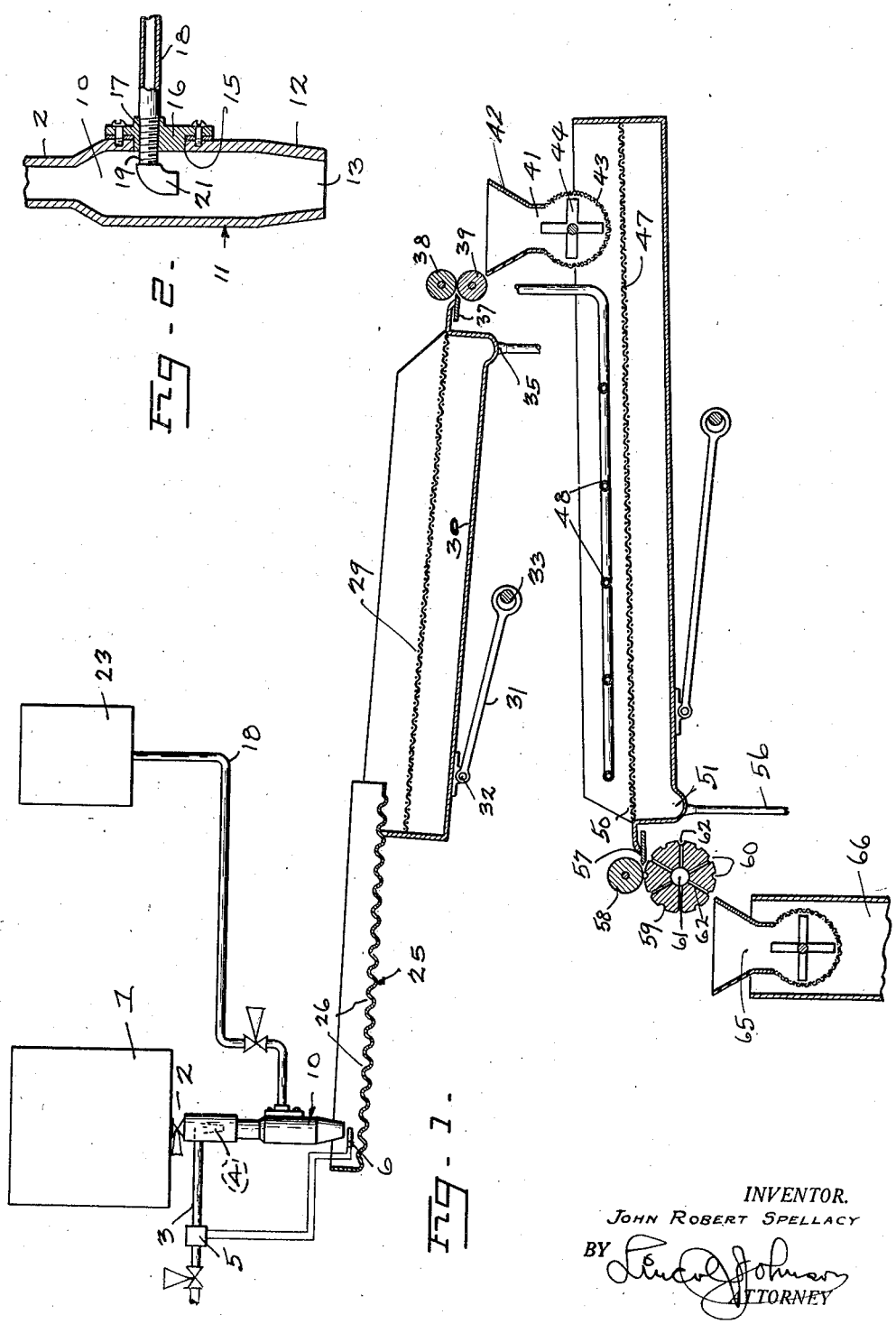
INVENTOR.
JOHN ROBERT SPELLACY
BY
ATTORNEY Patented Nov. 16, 1937

2,099,379

UNITED STATES PATENT OFFICE 2,099,379

METHOD OF MANUFACTURING CASEIN

John Robert Spellacy, Millbrae, Calif., assignor, by mesne assignments, to Hercules Powder Company, Wilmington, Del., a corporation of Delaware Application September 19, 1934, Serial No. 744,680

13 Claims. (Cl. 134—12)

An object of my invention is to provide a continuous method of coagulation of skim milk or butter milk by continuously subjecting the flow thereof to the action of dilute mineral acid or a mixture of acid and sour whey.

Another object of my invention is the provision of a method by which the flakes or particles of curd may be formed into an agglomerated mass or by control of acid added or dilution of acid added to produce a granular type of curd.

Another object of my invention is to provide a continuous and more rapid method of separating the precipitated curd from the whey than exists in any known process.

Another object of my invention is to provide a mixer for continuous mixing of preheated milk with dilute mineral acid, sour whey or a mixture of such acid and sour whey for the purpose of coagulation of the former.

Still another object of my invention is to provide a continuous process of the coagulation of skim milk or butter milk into curd in composed, compact, and non-mucilaginous form and free from impurities and acids.

Other objects and advantages appear in the following specification and the novel features of my invention will be particularly pointed out in the appended claims.

My invention is illustrated in accompanying drawing forming a part of the specification in which:

Figure 1 is a diagrammatic representation of a process of curdling the milk, conducted in accordance with the teachings of my invention; and Figure 2 is a vertical cross-section of the mixer.

It is well known that in order to secure the correct precipitation of curd from skim milk or butter milk the same must be preheated to certain temperature. This has been accomplished by various methods and devices. I have found that the best results are attained when the milk is heated while flowing from the storage tank to the curdling apparatus. In the drawing, I have shown a milk storage tank 1 having an outlet in the form of a pipe 2. A steam pipe 3 having a mixing T or suction T 4 is introduced into the pipe 2 and steam, delivered by the pipe 3 is directed immediately into the passing milk, heating the latter to a desirable temperature, preferably 114° F. The temperature may be easily controlled by means of the thermostatically regulated valve 5 operating in connection with the thermostat 6. The latter may be placed anywhere in the path of flow of the heated milk.

The preheated milk is thereafter subjected to the action of certain chemical agents to cause a coagulation of the milk. For this purpose I prefer to use one of the dilute mineral acids, such as muriatic, sulphuric, ethylsulphuric or the like, sour whey, or a mixture of such acid and sour whey. To attain better results in coagulation of the milk, I use a specially constructed mixer 10, which is shown in detail in Fig. 2.

The latter is made of acid proof material and comprises a cylindrical body 11 of somewhat larger diameter than that of the pipe 2, to which the mixer 10 is connected. The lower portion of the body 11 converges conically, as at 12, and terminates in an outlet opening 13 of a smaller diameter than that of the body 11. The mixer 10 has an opening 15 on the side thereof, which is closed by a cover 16 screwed or otherwise secured to the body 11. The cover 16 in turn has a threaded opening 17 therein. A pipe 18 is screwed therethrough so that its threaded end 19 is introduced inside of the mixer 10. The end 19 of the pipe 18 terminates with a nozzle 21, while its other end communicates with a tank 23 in which dilute mineral acid, sour whey, or a mixture of acid and sour whey is stored. The mixing nozzle 21 may be formed integrally with the body 11 and the supply pipe 18 tapped or connected into it.

The preheated milk passing through the mixer 10 is thoroughly mixed with the dilute mineral acid or curdling agent delivered by the nozzle 21 resulting in the instantaneous coagulation of the milk, and a finely coagulated milk or precipitated curd is formed. As the flow of the milk and the acid is continuous and uniform, the process of coagulation of the milk is also rapid, continuous and uniform and may be easily and conveniently regulated by changing the speed of flow of either the milk or the acid.

A riffle trough 25, comprising a metal trough with corrugated bottom 26, is placed directly beneath the mixer 10. The trough 25 is inclined at an angle to the horizontal which may be varied according to the desire of the operator. The precipitated curd flows from the mixer 10 onto the trough 25 and runs down the same in a rippling manner, whereby any milk, which may not have been coagulated and the free acid are kept together for sufficient time to permit a thorough firming, precipitation or solidifying of the curd to take place. The flow of the coagulated milk over the riffle trough also causes the curd to unite and form into large or small pieces, according to the angle of adjustment of the trough.

It has been noticed that when the angle of incline of the trough 25 is diminished and the speed of the flow of the coagulated milk is reduced, the curd forms larger pieces; if the angle of incline is increased and consequently the flow is accelerated, the curd leaves the trough in smaller and finer pieces. Therefore, by varying the angle of incline of the trough 25, the size of the lumps of the curd may accordingly be varied.

As the result of chemical reactions which take place in the mixer 10 and on the riffle trough 25, the milk is decomposed into two chief products; the curd containing proteins and lactic acid and milk salts, and the whey containing the soluble salts of milk, lactic acid, milk sugar, dilute mineral acid, etc. I provide novel means for the separation of the curd from the whey and other ingredients and impurities contained in the curd.

The lower end of the trough 25 is set directly over the upper end of a vibrating screen 29 onto which the curd and the whey is discharged. The screen is slightly inclined, as shown in Fig. 1, and has a bottom 30 to which a shaker arm 31 is connected at 32. The arm 31 is connected to an eccentric 33, which is rotated, by means not shown in the drawing and thus vibration is imparted to the screen 29. Other means of vibrating the screen might also be used. The curd being discharged onto the screen 29 and subjected to vibrations at high speed, slowly progresses to the lower end of the screen, while the whey and other liquid ingredients pass through the screen onto the bottom 30 and thence flow by means of a pipe 35, connected to the bottom, to a settling tank (not shown) where the fine curd that may have passed through the screen settles out and is thus salvaged. I have found that a better grade of casein is produced by separating the firmed curd as quickly as possible from the whey. This I accomplish by running the same over the vibrating screen, the neck of which allows the whey to drain off but holds the curd. By the time the curd passes the length of the screen it is relatively free of the whey. The curd is discharged from the screen 29 onto an inclined stationary apron 37 and it passes therefrom between the driven wringing rolls 38 and 39, rotated by means not shown on the drawing. The particular object of passing the curd through these squeezing rollers is to remove the major portion of the remaining whey and other liquid ingredients therefrom and also to prepare the curd to withstand washing with cold or warm water.

The curd drops from the rollers 38 and 39 into a beater 41 comprising a casing 42, having a screened bottom 43, and a number of blades 44 adapted to rotate at high speed. The curd is ground up or beaten to a fine condition, suitable for washing, and is discharged through the screened bottom 43 of the beater onto a second vibrating screen 47, similar in construction to the screen 29. A series of jets or sprays 48, placed over the screen 47, spray water onto the curd, which being vibrated at high speed slowly moves to the discharge end 50 of said screen. The water thus sprayed rapidly contacts the curd and washes all of the acid and impurities from the curd and immediately flows to the bottom 51 of the screen to be there collected and drained by the pipe 56. In my system, at no time does the curd remain in the whey or in the wash water as is the case in other processes of like character. The nature of the shower spray is such that the spray water does not collect around the curds. Thereafter the curd passes onto the inclined stationary apron 57 and therefrom into a roller press including the rollers 58 and 59, or into any conventional casein curd press. The latter roller has a number of small longitudinal grooves 60 on the surface thereof, communicating through radial holes 62 with the hollow interior 61 of said roller, thereby to drain the liquid constituents from the curd as much as possible. The curd thereafter falls into a second beater 65, identical in construction with the beater 41, and thereafter passes into a conventional dryer 66 or is otherwise disposed of.

My process is cheap, simple, and yields a good staple and strictly uniform product, which is extremely low in ash, acid and other impurities. It is continuous and therefore great quantities of milk may be handled economically and in a comparatively short time. Each separate step of the process is easily controlled and is adjustable to meet specific requirements.

The curd may be transferred directly from the first vibrating screen to the second vibrating screen, without pressing the whey and other liquid ingredients from the curd, but if this is done I have found the curd tends to break up into a fine condition when subjected to the shower spray, and hence to cut down the yield of curd. The step of pressing the curd between the first and second screens so solidifies the curd that it may be washed free of all impurities without actual loss of the curd.

Having thus described this invention, what I claim and desire to secure by Letters Patent is:

1. A continuous process of manufacturing casein comprising; precipitating curd from milk by adding to the latter a dilute acid; firming the precipitated curd into non-granular natural pieces in the resultant liquids; separating the firmed curd from said liquids; immediately thereafter squeezing the firmed curd in a continuously moving stream; milling the curd into small pieces; and washing and drying the curd; the squeezing step acting to prevent the disintegration of the curd into fine particles by the subsequent milling and washing steps.

2. The method of manufacturing casein in a continuous process, including continuous precipitation of milk to remove the curd therefrom; solidifying the curds thus obtained into firm non-granular pieces; separating the solidified curd from the whey; immediately thereafter pressing the curd in a continuously moving stream to remove the whey therefrom and condition the curd; passing the pressed curds through a shower spray of water and removing the water from the washed curds; the pressing step acting to prevent the disintegration of the curd into fine particles by the subsequent washing step.

3. The method of manufacturing casein in a continuous process comprising mixing continuously flowing streams of milk with a curdling agent to precipitate the curds from the whey; undulatingly flowing the whey and curds thus obtained to agglomerate the curds into natural non-granular pieces; subjecting the agglomerated curds and whey to continuous vibration while straining the whey from the curds to effect an instantaneous separation of the whey from the non-granular curds; pressing the residual whey from the curds; breaking the curds into small pieces; moving the broken curds through a water spray while being constantly vibrated; pressing the curds to remove the spray water therefrom; and breaking up the washed curds.

4. The method of manufacturing casein in a continuous process comprising intermixing streams of milk and a curdling agent to effect continuous precipitation of curds from the remaining liquids; solidifying the curds thus obtained into firm non-granular natural pieces; separating the curd from the whey; pressing the curd to remove the residual whey therefrom; spraying the pressed curds with water and pressing the wash water from the washed curds.

5. A continuous process of manufacturing casein, comprising mixing milk with a curdling agent to effect a continuous precipitation of curd therefrom; firming the curds thus obtained in natural non-granular pieces and separating the same from the remaining liquid ingredients; subjecting the curds to a squeezing and wringing step to remove residual whey and condition the curds for washing; spraying the curds with wash water, without allowing said wash water to collect around said curds, to wash the impurities from said curds.

6. A continuous process of manufacturing casein, comprising vibrating curd and whey while straining the whey from the curd to effect a rapid separation of the curd from the whey; conditioning the curd for washing by squeezing it; vibrating the separated curd while subjecting said curd to a shower of water to wash the impurities therefrom.

7. A continuous process of manufacturing casein, comprising vibrating curd and whey while straining the whey from the curd to effect a rapid separation of the curd from the whey; pressing said curd to remove all of the whey and liquid impurities therefrom and condition the curd for washing; and moving the pressed curd through a shower spray of water to remove any remaining impurities therefrom.

8. The process of manufacturing casein which comprises heating milk with steam, continuously adding acid to the heated milk, separating the curd from the whey by straining while being rapidly vibrated, conditioning the curd by pressure in a continuous thin-layered stream, subdividing the pressed curd, and washing the subdivided curd under a shower of water while being rapidly vibrated and strained.

9. The improvement in the process of manufacturing acid precipitated casein which comprises the step of passing the curd in a thin-layered stream through a pressure zone to condition the curd for washing, and to extract residual whey therefrom prior to such washing, and then washing the curd with water.

10. The improvement in the process of manufacturing acid precipitated casein which comprises the step of subjecting the natural non-granular new curd to pressure to condition the curd for washing, and to recover whey which would otherwise be lost, and then washing the curd with water.

11. The improvement in the process of manufacturing acid precipitated casein which comprises the step of passing the curd in a continuously moving stream through a wringing action to extract residual liquid therefrom and condition the curd for washing, and then washing the curd with water.

12. The improvement in the process of manufacturing acid precipitated casein, which consists in subjecting the natural non-granular curd removed from the whey, immediately after precipitation, to a squeezing and wringing action to remove residual whey and gas therefrom, thus causing the curd to further agglomerate in non-granular pieces capable of being washed without disintegration, and then washing the curd with water.

13. The improvement in the process of manufacturing acid precipitated casein which consists in subjecting newly treated curd and whey to an undulating flow to cause the curd to collect in non-granular pieces, screening the curd and whey by gravity, and then immediately thereafter subjecting the individual curd pieces to a squeezing and wringing action to further agglomerate and prepare them for resisting disintegration while being washed, and then washing the curd with water.

JOHN ROBERT SPELLACY.